Figure 1:
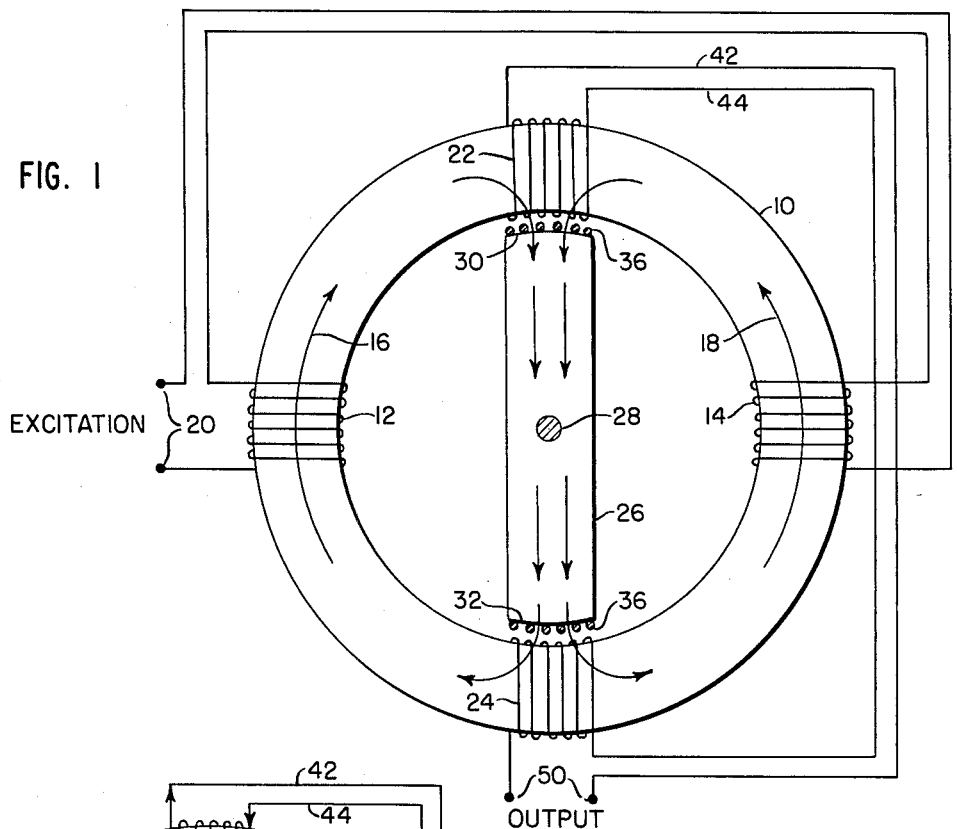

July 13, 1965 M. G. KONING 3,195,039
ELECTROMAGNETIC TRANSDUCER
Filed April 28, 1960

INVENTOR.
MENNO G. KONING
BY
ATTORNEYS

3,195,039
ELECTROMAGNETIC TRANSDUCER
Menno G. Koning, Dover, Mass., assignor to Northrop Corporation, Beverly Hills, Calif., a corporation of California
Filed Apr. 28, 1960, Ser. No. 25,359
4 Claims. (Cl. 323—51)

The present invention relates in general to dynamo transformers and in particular to an improved torquer and signal generator.

Some devices similar to the present invention are designed to produce or modify a signal in response to armature position. Other devices of the same general type are designed to produce torque in the form of armature rotation in response to the application of an input signal. Still others, like the present invention, are useful in both applications either separately or simultaneously. However, practically all of the devices are subject to a fault known as reaction torque. This reaction torque is a well known effect which causes the instrument to behave like a motor producing an erroneous signal when the device is used as a signal generator or an erroneous amount of torque when it is used as a torquer. The effect has been largely ignored because it is of importance only when extreme accuracy is required.

Where an instrument is used in conjunction with such devices as gyroscopes, for example in guidance systems, reaction torque becomes a critical factor. Since the instrument serves as an electrical link between the gyroscope and the system which is to be stabilized by the gyroscope, the entire stabilization operation can be no more accurate than the instrument itself. In these circumstances, minimization of reaction torque and its deleterious effects is essential.

Conventional torquers and signal generators are usually provided with protruding stator and rotor poles which terminate in so-called pole faces. The areas between the protruding poles of both the stator and the rotor are usually relieved in such a manner that the air gap between rotor and stator changes radially as the rotor is displaced from a null position and pole faces are no longer opposite one another. The symmetrical configuration of rotor and stator which is normally used provides compensation which maintains the total reluctance at substantially the same value as the position of the rotor changes. This is accomplished by having a decrease in the effective air gap between one pole face of the stator and a corresponding pole face of the rotor matched by an increase in the effective air gap between similar poles of opposite polarity. Nevertheless, because of fringing, structural discrepancies and other subtle effects, there is a change in the reluctance which occurs with the change in effective air gap. It is this changing reluctance which is primarily responsible for the troublesome reaction torque with which the present invention is concerned.

Therefore, it is the primary object of the present invention to provide an extremely accurate dynamo transformer.

It is another object of this invention to improve the performance of a dynamo transformer by eliminating significant reaction torque in such devices.

It is still another object of the present invention to minimize reaction torque in a dynamo transformer by maintaining a constant air gap between stator and rotor regardless of rotor position in the dynamo transformer.

In general, the present invention is organized about an instrument in which the stator and rotor are so constructed and disposed that the flux air gap between the stator and the rotor is substantially constant at all times. The rotor is provided with terminations or pole faces which are shaped to conform with the inner surface of the stator. The stator is annular in shape, and the rotor is centrally pivoted within the stator. The stator coils are wound directly on the stator annulus or ring, and the rotor pole faces conform to arcs of a circle concentric with the stator ring. Thus, with the rotor pivot being disposed at the axis about which the stator ring is formed, no change in the air gap results when the angular position of the rotor is changed.

The rotor, or armature, carries a coil which is wound about the curved stator terminations in a manner similar to that used in a d'Arsonval meter movement. Thus, the turns of the coil are substantially perpendicular to flux paths which follow the stator ring and which are completed through the rotor. The stator coils include pick-off windings which are wound on the stator ring opposite the armature terminations and excitation coils are wound on the stator ring at points equally spaced from the pick-off windings. The constant air gap provided by the configuration described results in substantially constant reluctance and eliminates or reduces reactance torque to an insignificant amount. For a better understanding of the present invention together with other and further objects, features and advantages, reference should be made to the following specification and the appended drawing in which FIG. 1 is a schematic illustration of a preferred embodiment of the invention and FIG. 2 is a schematic showing of the same embodiment under changed conditions.

Figure 2:
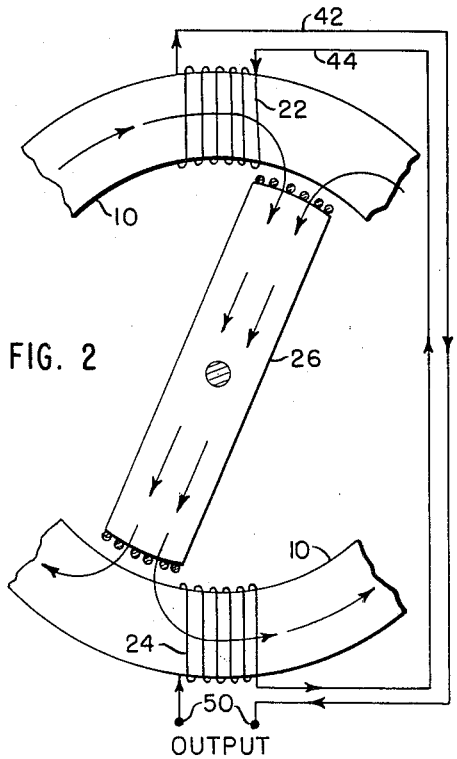

In FIG. 1 of the schematic, there is shown an annulus or ring 10 which forms the stator of one form of the instrument of the invention. The ring 10 is made of a magnetic material as is conventional in such instruments. A pair of similar excitation coils or windings 12 and 14 are wound on the stator ring at diametrically opposite points. The windings 12 and 14 are electrically connected in series opposition to permit the generation of identical but opposed fluxes, as indicated by the arrows 16 and 18, in the stator ring 10 in response to the application of a signal to a set of terminals 20.

At two other points about the stator ring, output or pick-off coils 22 and 24 are wound. In the illustrated device these windings are disposed at opposite points of the stator ring equidistant between the excitation coils 12 and 14. The output windings 22 and 24, however, are electrically connected in series-aiding relationship.

Within the stator ring 10, a rotor or armature 26 is disposed for rotation about a pivot 28. The pivot 28 is at the center of the stator ring 10 and the terminations of the rotor are formed into curved pole faces 30 and 32. The pole faces are circular arcs which are concentric with the stator ring 10. Thus, no matter what angular position the rotor assumes, the gap between the pole faces 30 and 32 and the inner surfaces of the stator ring 10 remains constant.

A torquer winding 36 is formed about the rotor 26 and passes over the pole faces 30 and 32. Electrical connections (not shown) to the torquer winding may be made in a conventional manner, as by means of slip rings or the like. The direction of the torquer winding, it will be noted, is substantially at right angles to the direction of rotation of the rotor.

The general theory of operation of the device may better be understood by considering the magnetic circuits of the device. Upon application of an exciting signal to the terminals 20, two magnetic circuits are established. One circuit includes the left half of the stator ring, the upper air gap between the stator ring and the pole face 30, the rotor 26 and the air gap between the pole face 32 and the stator ring. The other circuit includes the right half of the stator ring, the air gaps and the rotor. The two flux paths are indicated by the arrows.

Should the rotor 26 be angularly displaced, the flux paths remain essentially the same. Only the points of flux reversal, the points where the two magnetic circuits join are displaced in the stator ring to remain opposite the pole faces 30 and 32. Despite the shift of these points, there is no change in reluctance because the air gaps between the pole faces and the stator ring remain constant.

Considering first the application of the instrument as a signal generator, one might couple the rotor mechanically to a gyroscope gimbal. The object of such coupling would be to produce an output signal proportional to the angular displacement of gimbal and rotor. The desired result is realized in a straightforward manner. With the rotor 26 in its null position, the flux generated by the excitation windings 12 and 14 causes equal and opposite voltages to be induced in the output coils 22 and 24. These voltages effectively cancel one another.

In the event that the gyro gimbal and the rotor are moved, for example in a clockwise direction, the magnetic circuits which are completed through the rotor or armature are also displaced in a clockwise direction, but are otherwise unchanged except that the flux passing through the pick-off coils is no longer balanced. In FIG. 2, an exaggerated rotation of the armature is shown, and it may be seen that the flux path of the magnetic circuit which includes the left half of the stator ring 10 passes through the entire length of the pick-off coil 22, causing current to flow in the output leads 42 and 44 in the direction indicated by the arrows on those leads and an output signal to appear at the output terminals 50. In similar fashion, the flux path of the circuit which includes the right half of the stator ring 10 passes through the entire length of the pick-off coil 24 causing a current flow which adds to that generated in the pick-off coil 22.

In the case of counterclockwise rotation of the armature or rotor, the opposite result is obtained. In the normal course of events, such extreme displacement as that illustrated is not usually encountered, but even a very slight displacement causes an unbalance in the flux lines passing through the coils and the generation of an output signal of magnitude which may be proportional or otherwise related to the degree of displacement of the armature depending upon the arrangement of the turns of the pick-off coils.

The armature is also provided with a torquer winding 36 to which, as has been mentioned, connections may be made by way of slip rings or other similar conventional structure. The windings are shown only in section as they traverse the curved armature ends, but they are, of course, continuous about the length of the armature. The configuration is actually quite similar to that employed in a d'Arsonval meter movement or in conventional direct current permanent magnet torquers. Again, as in the case of the signal generator, the two magnetic circuits are set up and the flux paths are as illustrated in FIG. 1. If, at this juncture, a current is caused to flow in the torquer winding 36, a force or torque will be created. Because the torquer winding 36 is perpendicular to the flux, the torque which is created is perpendicular to the field and in a direction determined by the instantaneous polarity of the current. In the case of alternating current, the phase of the current determines the direction of the torque produced, that is, of armature rotation.

One of the operational features of the invention, namely the freedom of reaction torque is retained both in signal generator and in torquer applications because of the unvarying air gap which is maintained between the stator ring and the armature ends no matter what position the armature assumes.

Use of the invention without a separate torquer winding is also practical. In such circumstances torque in the armature is derived by application of the torquer input to the terminals 30 and 32, nominally the output windings. The torque produced under these circumstances varies with the product of the current in the windings 22 and 24 and that in the excitation windings. The physical displacement of the armature also, of course, varies with this product. The absence of reaction torque remains as a feature in this type of operation as in the others described above.

Finally, it is also contemplated that signal generation and torquer action be simultaneously achieved. Both a mechanical input, as from a gyro gimbal to the armature, and an electrical input to the excitation windings may be applied and an output electrical signal or torque, or both, may be taken from the device. Numerous variations of output, linear and non-linear, are obtainable by suitable changes in the winding and disposition of the various coils of the device. Moreover, the armature need not be a simple two-pole element, but may have any even number of multiple poles with which a corresponding number of excitation and output coils may be used. The disposition of the excitation and output coils would, of course, be symmetrical about the stator ring with that of the armature poles.

Accordingly, the invention should not be limited only to the precise details of the embodiment described and illustrated, but only by the spirit and scope of the appended claims.

What is claimed is:

1. A transducer comprising a circular stator ring of magnetic material, at least a pair of excitation coils wound on said ring at equally spaced points, means for energizing said excitation coils to set up opposing magnetic fluxes in said ring, a rotor element having at least a pair of pole faces, said rotor element being disposed within said stator ring and providing a return path for said magnetic fluxes, points of flux reversal being established in said stator ring opposite said pole faces, each said pole face having the shape of an arc of a circle concentric with said stator ring, at least a torquer winding on said rotor and at least a pick-off coil wound on said stator ring between said excitation coils.

2. A constant reluctance transducer comprising a circular stator ring consisting of magnetic material and having a uniform cross-section throughout, a pair of oppositely poled, series-connected excitation windings spaced 180° apart on said stator ring, means for energizing said excitation windings to provide a pair of identical opposed fluxes in said stator ring, a pair of series-connected, pick-off windings spaced 180° apart on said stator ring and symmetrically disposed between said excitation windings, means for deriving an output signal from said pick-off windings, an armature having a relatively large length-to-width ratio and being rotatably disposed within said stator ring to provide a common flux path between opposite points normally within said pick-off windings on said ring, said armature including a pair of curved pole faces normally positioned opposite said pick-off windings, the curvature of each of said pole faces conforming to that of said stator ring to maintain equal spacing therebetween regardless of the angular position of said armature, and a torquer winding disposed on said armature and having coils traversing said pole faces normal to the direction of armature rotation.

3. A transducer comprising a circular stator ring having a uniform inside diameter, at least one pair of excitation coils wound upon said stator ring, means for energizing said excitation coils to provide opposed magnetic fluxes in said stator ring, a rotatable armature disposed within said stator ring to provide a common flux path between opposite points on said ring, said armature having at least one pair of oppositely disposed poles, each having a pole face shaped to conform to said stator ring, at least a torquer winding disposed upon said armature, at least a pick-off winding disposed upon said stator ring between said excitation windings, and means for deriving a signal from said pick-off winding.

4. In a transducer having a circular stator ring and means for producing opposing magnetomotive forces in said ring, the combination of a plurality of pick-off windings disposed at predetermined points on said ring, a rotor disposed within said stator ring to establish predetermined points of flux reversal, each of said pick-off windings being remote from said points of flux reversal, said rotor including poles having pole faces shaped to conform to said stator ring and uniformly spaced therefrom irrespective of the angular position of said rotor within said ring, said pole faces being normally disposed adjacent said points of flux reversal, at least a torquer winding disposed upon said rotor and traversing said pole faces in a direction normal to the plane of rotation of said rotor, and means for deriving signals from said pick-off windings, said signals varying as a function of angular displacement of said rotor within said stator ring.

References Cited by the Examiner

UNITED STATES PATENTS

| | | | |
|---|---|---|---|
| 2,204,916 | 6/40 | Shotter | 336—130 X |
| 2,669,126 | 2/54 | Simmons | 336—30 |
| 2,825,830 | 3/58 | Davis | 336—130 X |
| 2,882,484 | 4/59 | Swainson | 323—51 |
| 2,886,751 | 5/59 | Gilbert | 336—122 X |

LLOYD McCOLLUM, *Primary Examiner.*

MILTON O. HIRSHFIELD, ROBERT C. SIMS,
*Examiners.*